(12) United States Patent
Kim et al.

(10) Patent No.: US 7,572,496 B2
(45) Date of Patent: Aug. 11, 2009

(54) RECORDING MEDIUM HAVING HIGH MELTING POINT RECORDING LAYER, INFORMATION RECORDING METHOD THEREOF, AND INFORMATION REPRODUCING APPARATUS AND METHOD THEREFOR

(75) Inventors: Joo-Ho Kim, Yongin-si (KR); Junji Tominaga, Ibaraki (JP)

(73) Assignees: Samsung Electronics Co., Ltd., Suwon-Si (KR); National Institute of Advanced Industrial Science and Technology, Tokyo (JP)

( * ) Notice: Subject to any disclaimer, the term of this patent is extended or adjusted under 35 U.S.C. 154(b) by 654 days.

(21) Appl. No.: 10/514,422

(22) PCT Filed: May 16, 2003

(86) PCT No.: PCT/KR03/00968

§ 371 (c)(1),
(2), (4) Date: Jun. 29, 2005

(87) PCT Pub. No.: WO03/098620

PCT Pub. Date: Nov. 27, 2003

(65) Prior Publication Data

US 2005/0249065 A1 Nov. 10, 2005

(30) Foreign Application Priority Data

May 16, 2002 (JP) ............................. 2002-141664

(51) Int. Cl.
*B32B 3/02* (2006.01)
(52) U.S. Cl. ................. 428/64.1; 428/64.4; 430/270.12
(58) Field of Classification Search ................ 428/64.1, 428/64.4; 430/270.12
See application file for complete search history.

(56) References Cited

U.S. PATENT DOCUMENTS 5,255,260 A 10/1993 Yamada et al.

(Continued)

FOREIGN PATENT DOCUMENTS

EP 0 836 179 4/1998

(Continued)

OTHER PUBLICATIONS

Rigid bubble pit formation and huge signal enhancement in super-resolution near-field structure disk with platinum-oxide layer, Applied Physics Letters, vol. 81, No. 25, Dec. 16, 2002, T. Kikukawa, T. Nakano, T. Shima, and J. Tominaga.

(Continued)

*Primary Examiner*—Elizabeth Mulvaney
(74) *Attorney, Agent, or Firm*—Staas & Halsey LLP

(57) ABSTRACT

A simple-structured recording medium without a mask layer and information recording and reproducing methods, which resolve thermal stability related problems arising during reproduction, the recording medium including a high melting point recording layer between first and second dielectric layers. The method of recording information on the recording medium involves irradiating a laser beam onto the recording medium to induce reaction and diffusion in the high melting point recording layer and the first and second dielectric layers. The method of reproducing information recorded on such a super-resolution near-field recording medium by the above method involves generating plasmon using crystalline particles of the high melting point recording layer and the first and second dielectric layers as a scatter source to reproduce information regardless of a diffraction limit of a laser used.

16 Claims, 12 Drawing Sheets

U.S. PATENT DOCUMENTS

| | | | |
|---|---|---|---|
| 5,348,783 | A | 9/1994 | Ohno et al. |
| 5,419,999 | A | 5/1995 | Uejima |
| 5,569,517 | A | 10/1996 | Tominaga et al. |
| 5,604,003 | A | 2/1997 | Coombs et al. |
| 5,709,978 | A * | 1/1998 | Hirotsune et al. ...... 430/270.13 |
| 5,761,188 | A | 6/1998 | Rosen et al. |
| 5,768,221 | A | 6/1998 | Kasmi et al. |
| 5,786,117 | A | 7/1998 | Hoshi et al. |
| 5,981,014 | A | 11/1999 | Tsukagoshi et al. |
| 6,181,650 | B1 | 1/2001 | Ichihara et al. |
| 6,190,750 | B1 | 2/2001 | Wierenga et al. |
| 6,329,036 | B1 | 12/2001 | Kikukawa et al. |
| 6,410,115 | B1 * | 6/2002 | Tsai et al. ................. 428/64.1 |
| 6,670,013 | B2 * | 12/2003 | Zhou ........................ 428/64.1 |
| 6,965,556 | B1 * | 11/2005 | Kikukawa et al. ........... 369/284 |
| 6,999,392 | B2 * | 2/2006 | Kato et al. ............... 369/59.11 |

FOREIGN PATENT DOCUMENTS

| | | |
|---|---|---|
| EP | 1 197 956 | 4/2002 |
| JP | 03-157830 | 7/1991 |
| JP | 5-258345 | 10/1993 |
| JP | 6-251422 | 9/1994 |
| JP | 8-63789 | 3/1996 |
| JP | 09-007224 | 1/1997 |
| JP | 9-17028 | 1/1997 |
| JP | 9-128807 | 5/1997 |
| JP | 11-134713 | 5/1999 |
| JP | 2000-190637 | 7/2000 |
| JP | 2001-067668 | 3/2001 |
| JP | 2001-283466 | 10/2001 |
| JP | 2003-077174 | 3/2003 |

OTHER PUBLICATIONS

U.S. Appl. No. 09/620,469, filed Jul. 20, 2000, Du-seoop Yoon et al., Samsung Electronics Co., Ltd.

U.S. Appl. No. 10/509,367, filed Sep. 28, 2004, Joo-Ho Kim et al., Samsung Electronics Co., Ltd.

Kim Jooho et al. "Reactive recording with rare-earth transition metal"; Applied Physics Letters, AIP, American Institute Of Physics; Melville, New York ; vol. 79. No. 16; Oct. 15, 2001.

Rebecca Bussjager et al. "Using Tungsten Oxide Based Thin Films For Optical Memory And The Effects Of Using IR Combined With Blue/Blue-Green Wavelengths" Japanese Journal of Applied Physics, Japan Society of Applied Physics; Tokyo Japan; vol. 39, Part 1, No. 2B' Feb. 2000.

Supplemental European Search Report for corresponding European Application 03723471.3-1232, mailed on Jun. 20, 2008.

* cited by examiner

CRYSTALLINE PARTICLES FORMED BY REACTION AND DIFFUSION

US 7,572,496 B2

RECORDING MEDIUM HAVING HIGH MELTING POINT RECORDING LAYER, INFORMATION RECORDING METHOD THEREOF, AND INFORMATION REPRODUCING APPARATUS AND METHOD THEREFOR

CROSS-REFERENCE TO RELATED APPLICATIONS

This application is a National Stage of PCT Application No. PCT/KR2003/968, filed May 16, 2003 in the World Intellectual Property Office, and Japanese Patent Application No. 2002-141664 filed on May 16, 2002 in the Japanese Patent Office, the disclosures of which are incorporated herein by reference.

BACKGROUND OF THE INVENTION

1. Field of the Invention

The present invention relates to a recording medium, and more particularly, to a recording medium having a high melting point recording layer, an information recording method thereof, and an apparatus and method for reproducing information therefrom.

2. Description of the Related Art

Conventional recording media can be classified into magneto-optical recording media or phase change recording media. In magneto-optical recording media, such as mini disks (MDs), information is read by detecting the rotation of a straight polarized light reflected from a magnetic film depending on the magnetic force and the magnetization direction of the magnetic film. The rotation of the reflected light is known as the "Kerr Effect". In phase change recording media, such as digital versatile discs (DVDs), information is read based on the difference in reflectivity due to the different absorption coefficients of an optical constant between an amorphous recorded domain and a crystalline non-recorded domain of the recording medium.

Recently, many diversified methods of recording information using micro marks (pits), as in a phase change method, and reproducing information from the recording medium regardless of the diffraction limit have been suggested. The most interested one among these methods is a recording method using a super-resolution near-field structure, which is disclosed in Applied Physics Letters, Vol. 73, No. 15, October 1998, and Japanese Journal of Applied Physics, Vol. 39, Part I, No. 2B, 2000, pp. 980-981. A super-resolution near-field structure utilizes local surface plasmon generated in a special mask layer to reproduce information. The super-resolution near-field structure is classified as an antimony (Sb) transmission type which has an antimony mask layer that becomes transparent by laser irradiation when reproducing information from the recording medium or as a silver oxide decomposition type which has a silver oxide ($AgO_x$) mask layer that decomposes into oxygen and silver, which acts as a scattering source inducing local plasmon.

FIG. 1 illustrates the structure of a recording medium using a conventional super-resolution near-field structure and the recording principle thereof. Such a structure as illustrated in FIG. 1 is referred to as "single-masked super-resolution near-field structure".

As shown in FIG. 1, the recording medium includes a second dielectric layer 112-2 made of dielectric materials, for example, ZnS—$SiO_2$, a recording layer 115 made of, for example, GeSbTe, a protective layer 114 made of dielectric materials, for example, ZnS—$SiO_2$ or SiN, a mask layer 113 made of, for example, Sb or $AgO_x$, a first dielectric layer 112-1 made of dielectric materials, for example, ZnS—$SiO_2$ or SiN, and a transparent polycarbonate layer 111, which are sequentially stacked upon one another. When the mask layer 113 is made of Sb, SiN is used for the protective layer 114 and for the first dielectric layer 112-1. When the mask layer 113 is made of $AgO_x$, ZnS—$SiO_2$ is used for the protective layer 114 and for the first dielectric layer 112-1. The protective layer 114 prevents reaction between the recording layer 115 and the mask layer 113 and becomes a place where a near field acts when reproducing information. When reproducing the information, Sb of the mask layer 113 becomes transparent, and $AgO_x$ of the mask layer 113 decomposes into oxygen and silver, which acts as a scattering source inducing local plasmon.

The recording medium is irradiated with a laser beam of about 10-15 mW emitted from a laser source 117 through a focusing lens 118 to heat the recording layer 115 above 600° C. so that a laser-irradiated domain of the recording layer 115 becomes amorphous and has a smaller absorption coefficient k regardless of the change of refractive index n of an optical constant (n,k). In an irradiated domain of the Sb or $AgO_x$ mask layer 113, the crystalline structure of Sb changes or the quasi-reversible $AgO_x$ decomposes, generating a probe as a near-field structure pointing at a region of the recording layer 115. As a result, it is possible to reproduce information recorded on the recording medium as micro marks which are smaller in size than a diffraction limit of the laser used. Therefore, it is possible to reproduce information recorded in a high-density recording medium using such a super-resolution near-field structure regardless of a diffraction limit of the laser used.

FIG. 2 illustrates the structure of a recording medium using another super-resolution near-field structure and the recording principle thereof. Such a structure as illustrated in FIG. 2 with two mask layers is referred to as "double-masked super-resolution near-field structure" and provides improved performance over a single-masked super-resolution near-field structure.

As shown in FIG. 2, the recording medium includes a second dielectric layer 122-2 made of dielectric materials, for example, ZnS—$SiO_2$, a second mask layer 123-2 made of, for example, Sb or $AgO_x$, a second protective layer 124-2 made of dielectric materials, for example, ZnS—$SiO_2$ or SiN, a recording layer 125 made of, for example, GeSbTe, a first protective layer 124-1 made of dielectric materials, ZnS—$SiO_2$ or SiN, a first mask layer 123-1 made of, Sb or $AgO_x$, a first dielectric layer 122-1 made of dielectric materials, for example, ZnS—$SiO_2$ or SiN, and a transparent polycarbonate layer 121, which are sequentially stacked upon one another. When the first and second mask layers 123-1 and 123-2 are made of Sb, SiN is used for the first and second protective layers 124-1 and 124-2 and the first and second dielectric layers 122-1 and 122-2. When the first and second mask layers 123-1 and 123-2 are made of $AgO_x$, ZnS—$SiO_2$ is used for the first and second protective layers 124-1 and 124-2 and the first and second dielectric layers 122-1 and 122-2. The second mask layer 123-2 generates surface plasmon at a side of the recording medium opposite to the laser irradiation side. The first and second protective layers 124-1 and 124-2 prevent reaction between the recording layer 125 and the respective first and second mask layers 123-1 and 123-2. Particularly, the first protective layer 124-1 acts as a near field when reproducing information. When reproducing information, Sb of the first and second mask layers 123-1 and 123-2 becomes transparent, and $AgO_x$ of the first and second mask layers 123-1 and 123-2 decomposes into oxygen and silver, which acts as a scattering source inducing local plasmon.

The recording medium is irradiated with a laser beam of about 10-15 mW emitted from a laser source 117 through a focusing lens 118 to heat the recording layer 125 above 600° C. so that a laser-irradiated domain of the recording layer 125 becomes amorphous and has a smaller absorption coefficient k, regardless of the change of refractive index n of an optical constant (n,k). In an irradiated domain of the first and second mask layers 123-1 and 123-2, which are made of Sb or $AgO_x$, the crystalline structure of Sb changes or the quasi-reversible $AgO_x$ decomposes, generating a probe as a near-field structure pointing at a region of the recording layer 125. As a result, it is possible to reproduce information recorded on the recording medium as micro marks which are smaller in size than a diffraction limit of the laser used. Therefore, it is possible to reproduce information recorded in a high-density recording medium using a super-resolution near-field structure regardless of a diffraction limit of the laser used.

However, in recording media having such a super-resolution near-field structure, since the mask layer and recording layer have similar transition temperatures, ensuring thermal stability to both the mask layer and the recording layer during information reproduction is important. Possible solutions to this problem include dropping the transition temperature of the mask layer and raising the transition temperature of the recording layer. However, it is not easy to induce a larger difference in transition temperature between the mask layer and the recording layer due to the nature of the materials forming the two layers.

SUMMARY OF THE INVENTION

According to an aspect of the present invention there is provided a simple-structured recording medium without a mask layer, the recording medium having a high melting point recording layer, an information recording method thereof, and an apparatus and method for reproducing information from the recording medium.

In accordance with another aspect of the present invention, there is provided a recording medium comprising a high melting point recording layer between first and second dielectric layers.

In accordance with another aspect of the present invention, there is provided a method of recording information on a recording medium having a high melting point recording layer between first and second dielectric layers, the method including irradiating a laser beam onto the recording medium to induce reaction and diffusion in the high melting point recording layer and the first and second dielectric layers.

In accordance with another aspect of the present invention, there is provided an apparatus of reproducing information from a recording medium having a high melting point recording layer between first and second dielectric layers, the apparatus generating plasmon using crystalline particles of the high melting point recording layer and the first and second dielectric layers as a scattering source to reproduce information recorded in the recording layer using a super-resolution near-field structure regardless of the diffraction limit of the laser used.

In accordance with another aspect of the present invention, there is provided a method of reproducing information from a recording medium having a high melting point recording layer between first and second dielectric layers, the method including generating plasmon using crystalline particles of the high melting point recording layer and the first and second dielectric layers as a scattering source to reproduce information recorded in the recording layer using a super-resolution near-field structure regardless of the diffraction limit of the laser used.

According to another aspect of the above-described recording medium, information recording method, and information reproducing apparatus and method, the high melting point recording layer may be formed of tungsten (W), tantalum (Ta), a tungsten compound (W-x), or a tantalum compound (Ta-x). An additional reflective layer may be formed underneath the second dielectric layer, for example, using silver (Ag) or aluminum (Al).

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which:

FIG. 3B is an enlarged view of a recorded domain of FIG. 3A;

FIG. 4B is an enlarged view of a recorded domain of FIG. 4A.

DETAILED DESCRIPTION OF THE EMBODIMENTS

Figure 1:
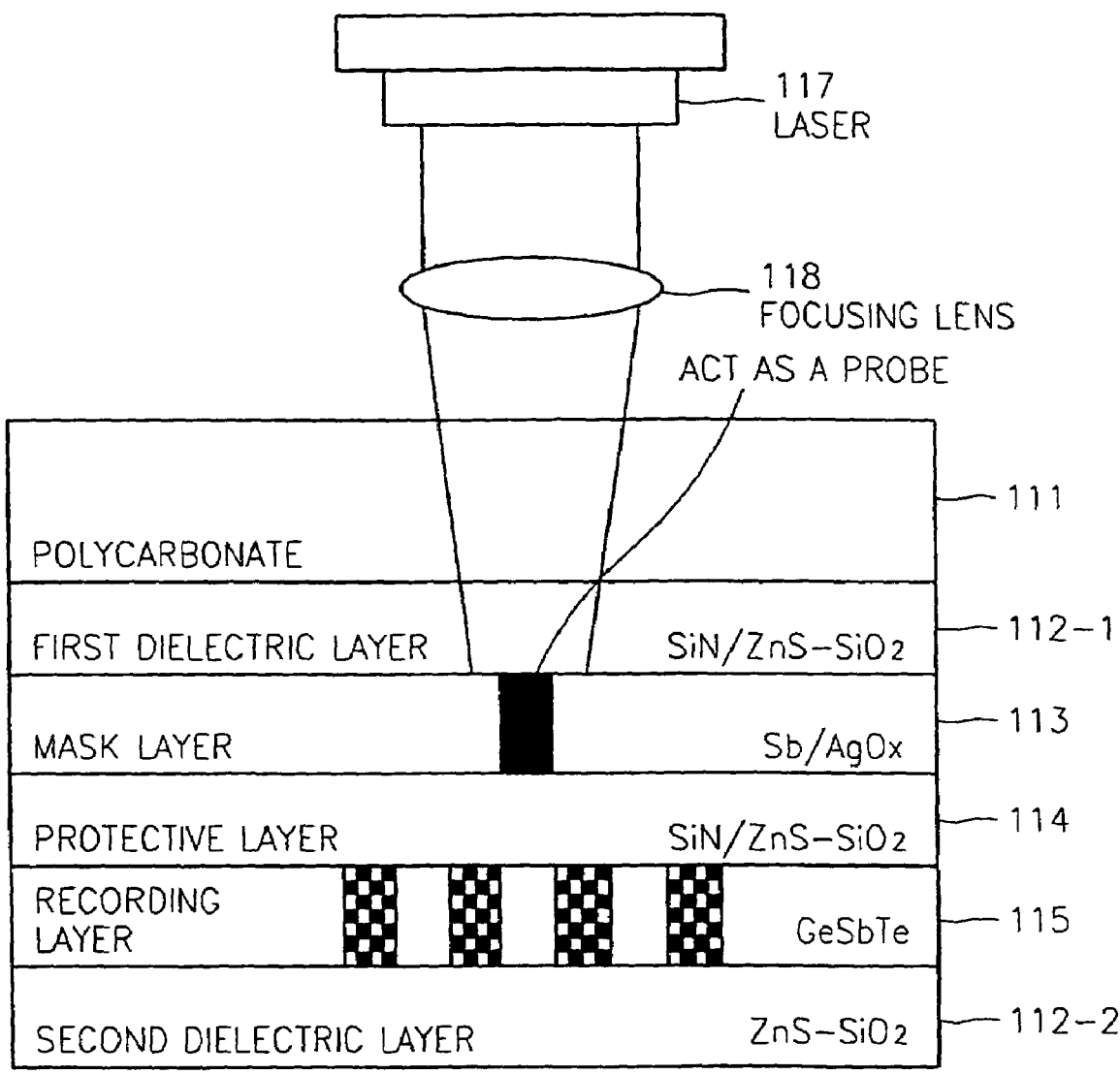
FIG. 1 illustrates the structure of a conventional recording medium using a super-resolution near-field structure and a recording principle thereof.

Reference will now be made in detail to the embodiments of the present invention, examples of which are illustrated in the accompanying drawings, wherein like reference numerals refer to the like elements throughout. The embodiments are described below to explain the present invention by referring to the figures.

Figure 3A:
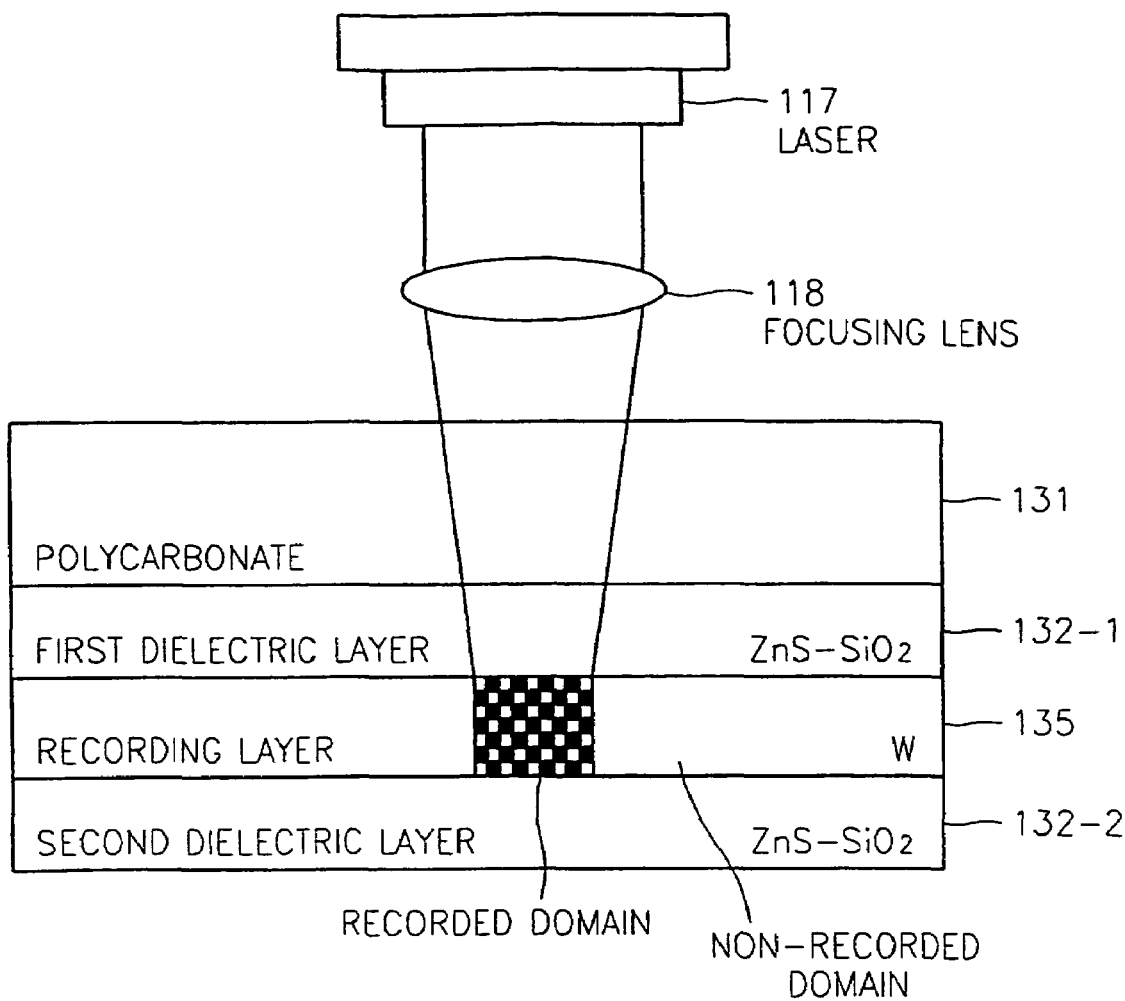
FIGS. 3A and 3B illustrate a recording medium according to an embodiment of the present invention and the recording principle thereof, and in particular.
Figure 3B:
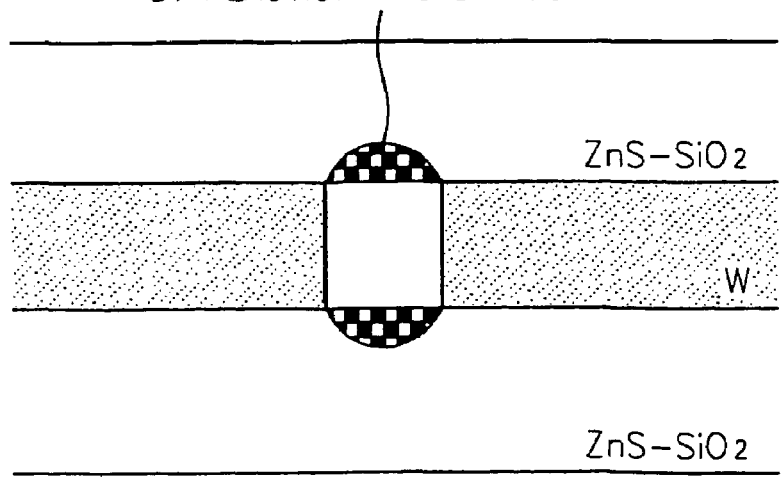

A recording medium according to an embodiment of the present invention and the recording principle are illustrated in FIGS. 3A and 3B. In particular, FIG. 3B is an enlarged view of a recorded domain of FIG. 3A.

Referring to FIG. 3A, a recording medium according to an embodiment of the present invention includes a second dielectric layer 132-2 made of dielectric materials, for example, $ZnS$—$SiO_2$, a high melting point recording layer 135 made of, for example, tungsten (W), tantalum (Ta), a tungsten compound (W-x), or a tantalum compound (Ta-x), a first dielectric layer 132-1 made of dielectric materials, for example, $ZnS$—$SiO_2$, and a transparent polycarbonate layer 131, which are sequentially stacked upon one another.

The recording medium is irradiated with a laser beam of about 11 mW and 405 nm wavelength emitted from a high-power laser source 117 through a focusing lens 118 to heat the recording layer 135 equal to or above 600° C. to induce reaction and diffusion in a laser-irradiated domain. W, Ta, W-x, or Ta-x in the recording layer 135 diffuse into the first and second dielectric layers 132-1 and 132-2, interact with ZnS—SiO$_2$ composing the two dielectric layers, and are crystallized.

FIG. 3B illustrates a physical change in a laser-irradiated domain of the recording layer 135. As shown in FIG. 3B, the recording layer 135 has swollen at the laser-irradiated domain. A swollen portion of the recording layer 135 in the direction of the first dielectric layer 132-1 contributes to generating a near field when reproducing information. In addition, the crystalline particles of the recording layer 135 and the first dielectric layer 132-1 formed by the reaction and diffusion by laser irradiation act as a scattering source generating surface plasmon when reproducing information. As a result, it is possible to reproduce information recorded on the recording medium as micro marks which are smaller in size than a diffraction limit of the laser used. Therefore, it is possible to reproduce information recorded in a high-density recording medium using such a super-resolution near-field structure regardless of a diffraction limit of the laser used.

Figure 4A:
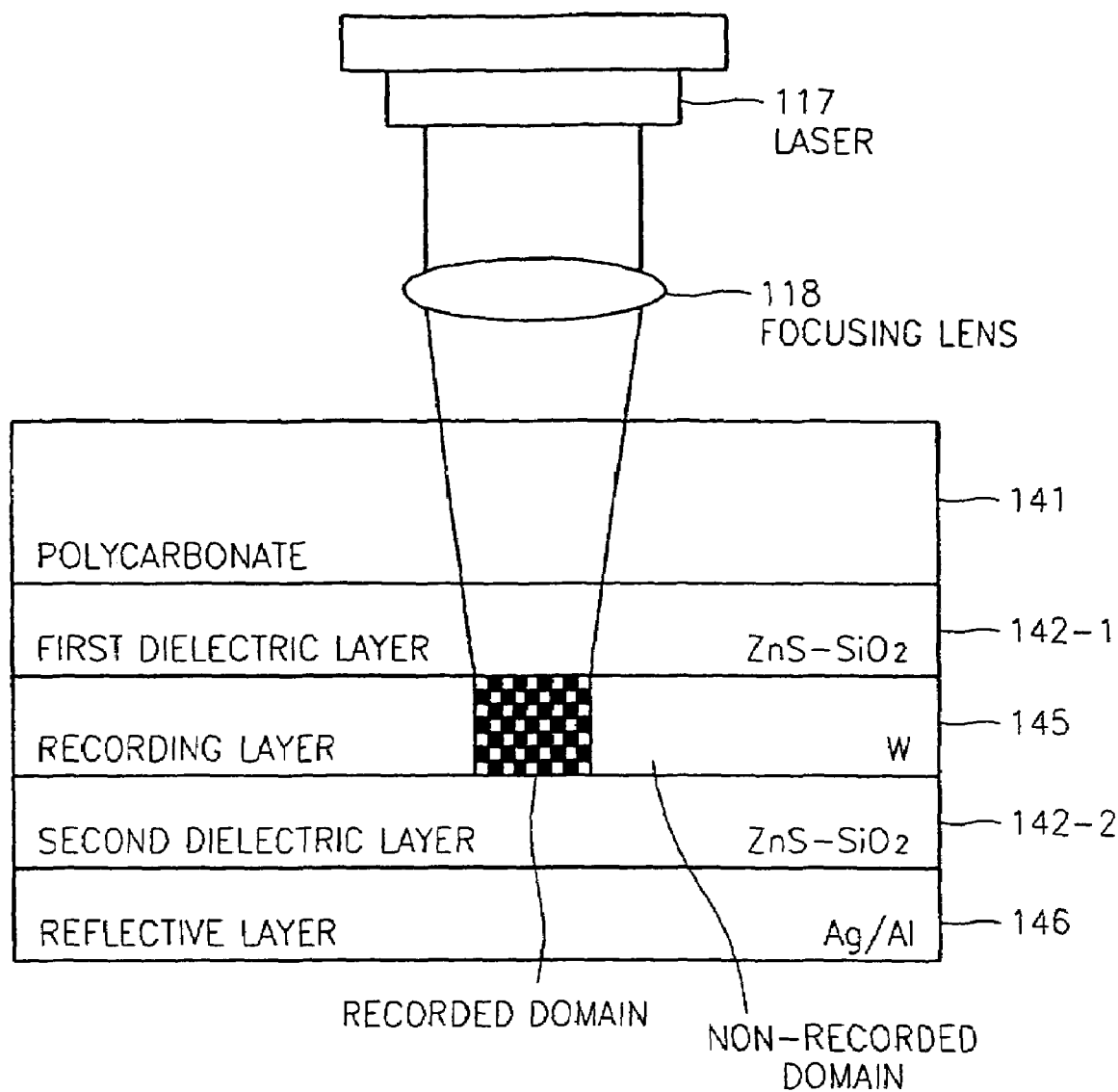
FIGS. 4A and 4B illustrate a recording medium according to another embodiment of the present invention and the recording principle thereof, and in particular.
Figure 4B:
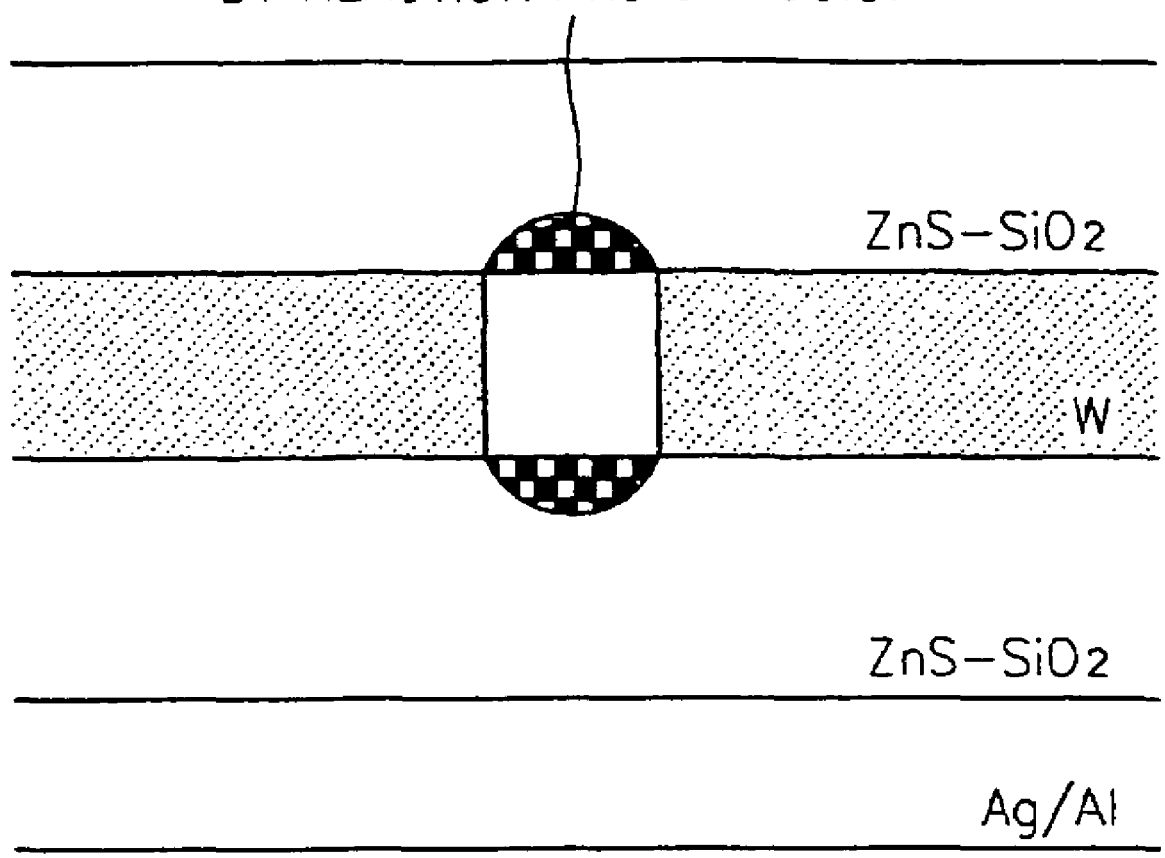

FIGS. 4A and 4B illustrate the structure of a recording medium according to another embodiment of the present invention and the recording principle thereof, and in particular, FIG. 4B is an enlarged view of a recorded domain of FIG. 4A.

Referring to FIG. 4A, a recording medium according to another embodiment of the present invention includes a reflective layer 146 made of, for example, silver (Ag) or aluminum (Al), a second dielectric layer 142-2 made of dielectric materials, for example, ZnS—SiO$_2$, a high melting point recording layer 145 made of, for example, tungsten (W), tantalum (Ta), a tungsten compound (W-x), or a tantalum compound (Ta-x), a first dielectric layer 142-1 made of dielectric materials, for example, ZnS—SiO$_2$, and a transparent polycarbonate layer 141, which are sequentially stacked upon one another.

The recording medium is irradiated with a laser beam of about 11 mW and 405 nm wavelength emitted from the high-power laser source 117 through the focusing lens 118 to heat the recording layer 145 equal to or above 600° C. to induce reaction and diffusion in a laser-irradiated domain. W, Ta, W-x, or Ta-x in the recording layer 145 diffuse into the first and second dielectric layers 142-1 and 142-2, interact with ZnS—SiO$_2$ composing the two dielectric layers, and are crystallized. The reflective layer 146, which is made of Ag or Al, induces reaction and diffusion in the side of the recording layer 145 opposite to the laser irradiation side and the second dielectric layer 142-2, to a similar degree as the reflective layer induces reaction and diffusion in the side of the recording layer 145 and the first dielectric layer 142-1 onto which the laser beam is directly irradiated, enhancing the effect of the reaction and diffusion in the directly laser-irradiated side.

FIG. 4B illustrates a physical change in the laser-irradiated domain of the recording layer 145. As shown in FIG. 4B, the recording layer 145 is swollen at the laser-irradiated domain. A swollen portion of the recording layer 145 in the direction of the first dielectric layer 142-1 contributes to generating a near field when reproducing information. In addition, the crystalline particles of the recording layer 145, the first dielectric layer 142-1 and the second dielectric layer 142-2 formed by the reaction and diffusion by laser irradiation act as a scattering source generating surface plasmon when reproducing information. As a result, it is possible to reproduce information recorded on the recording medium as micro marks which are smaller in size than a diffraction limit of the laser used. Therefore, it is possible to reproduce information recorded in a high-density recording medium using such a super-resolution near-field structure regardless of a diffraction limit of the laser used.

Figure 5:
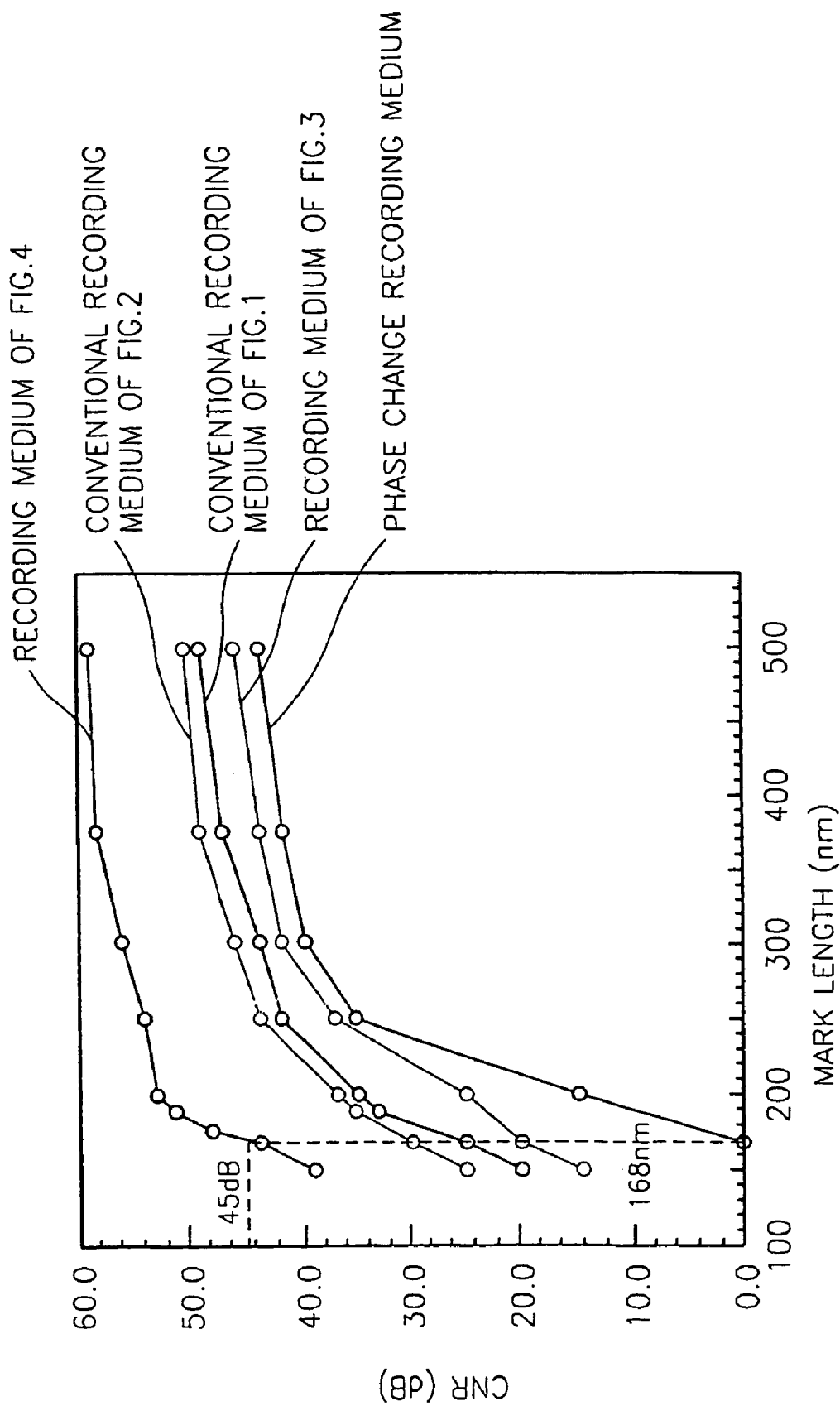
FIG. 5 is a comparative graph of a carrier to noise ratio (CNR) versus mark length for the recording media according to an aspect of the present invention and the conventional recording media.
Figure 6A:
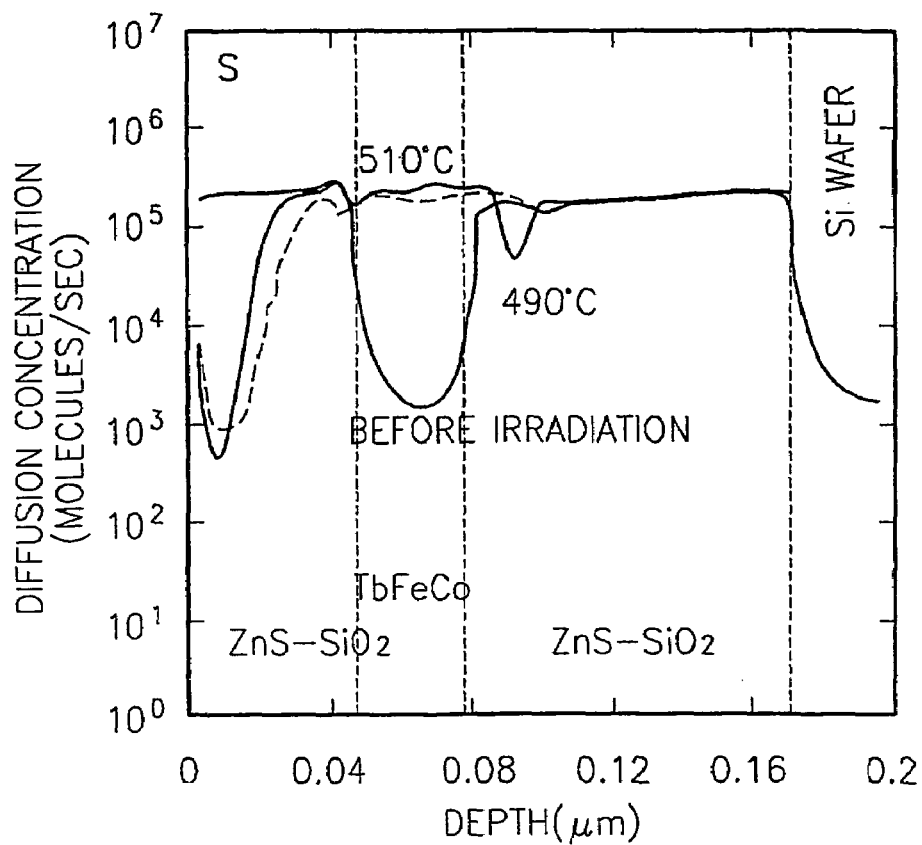
Figure 6B:
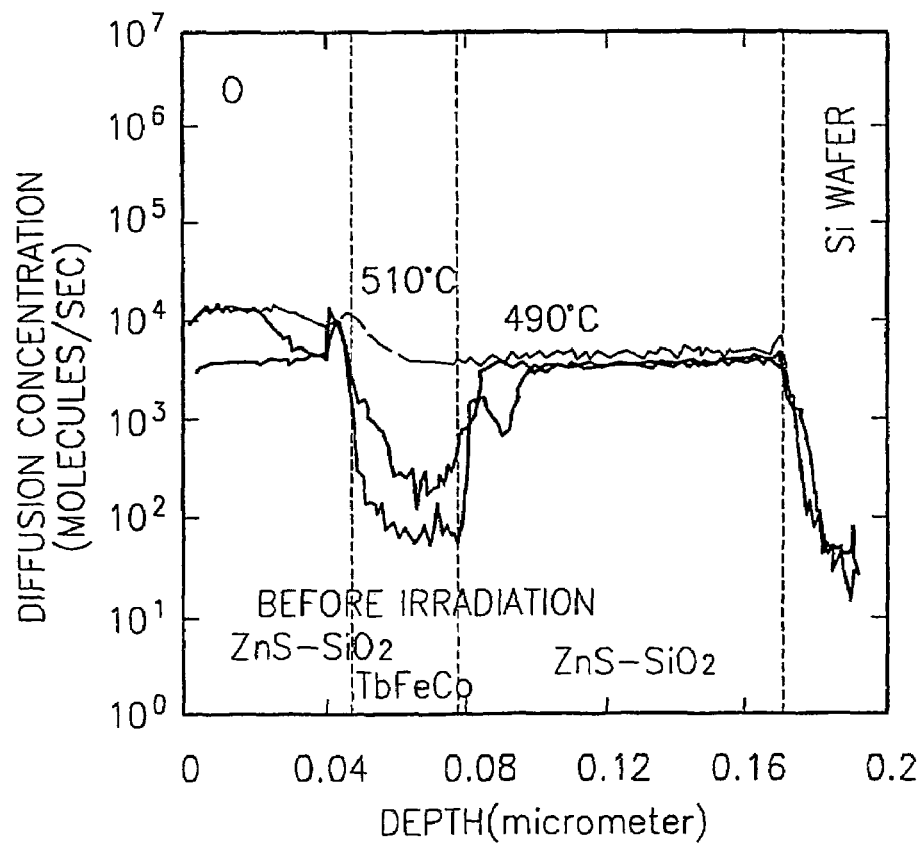
Figure 7A:
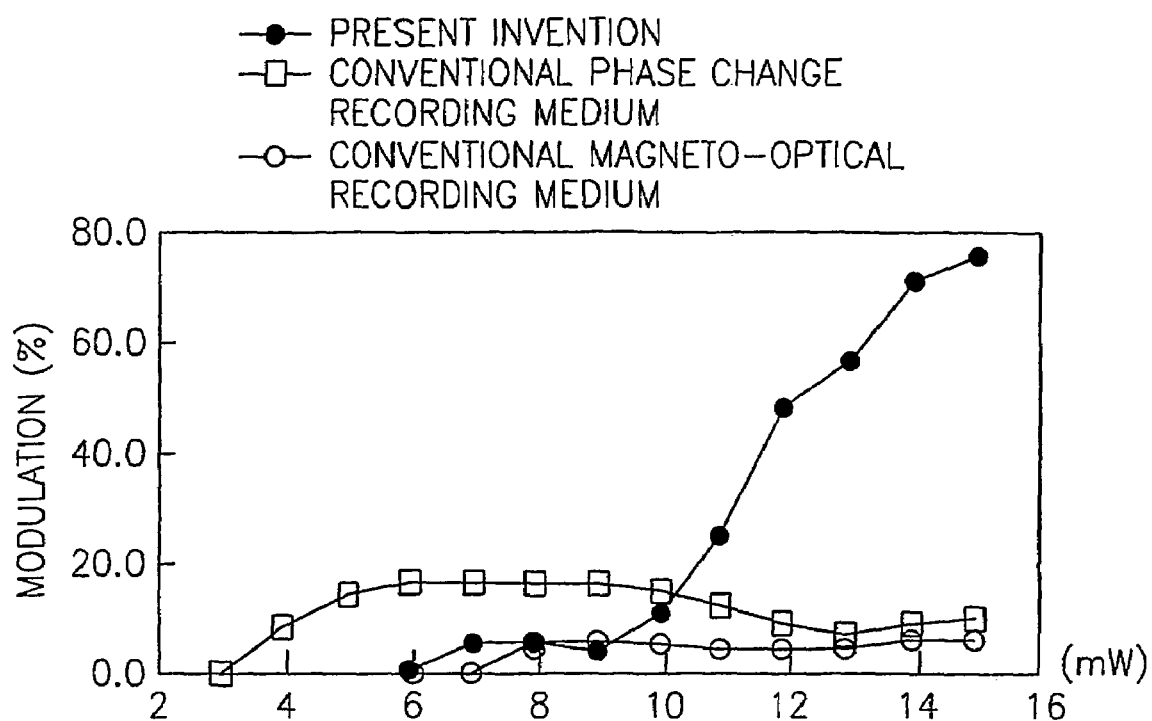
Figure 7B:
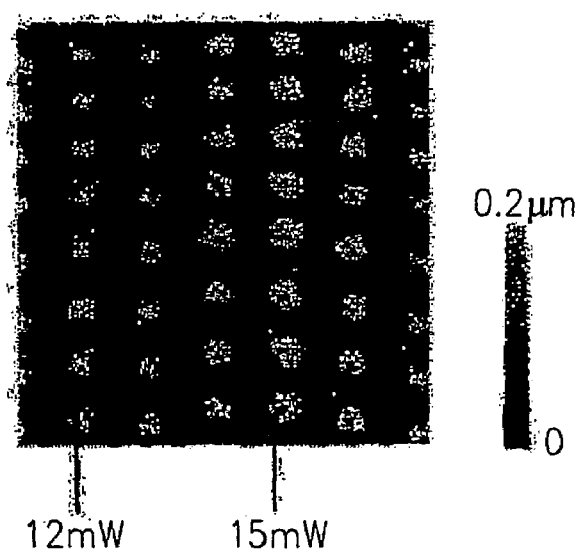
Figure 7C:
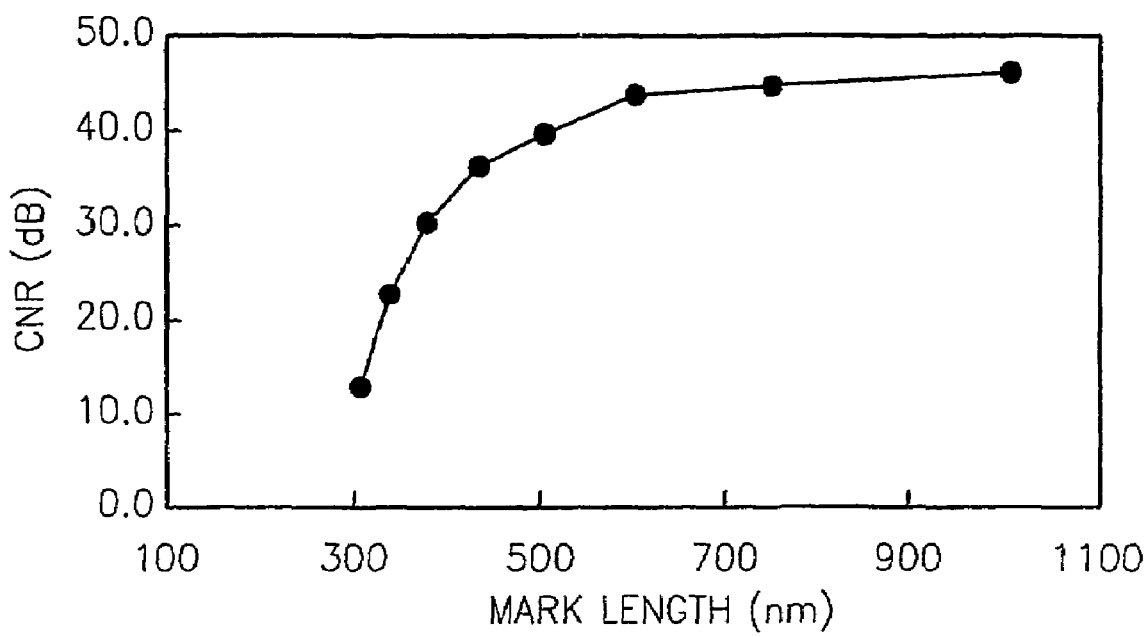
Figure 8A:
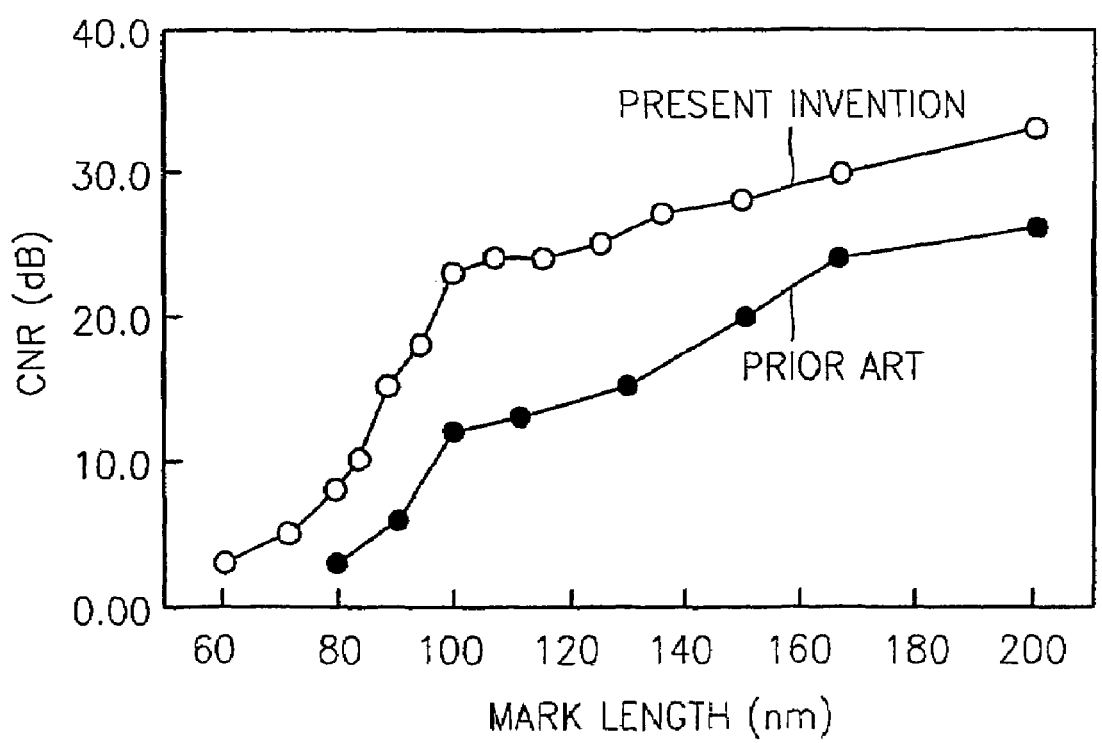
Figure 8B:
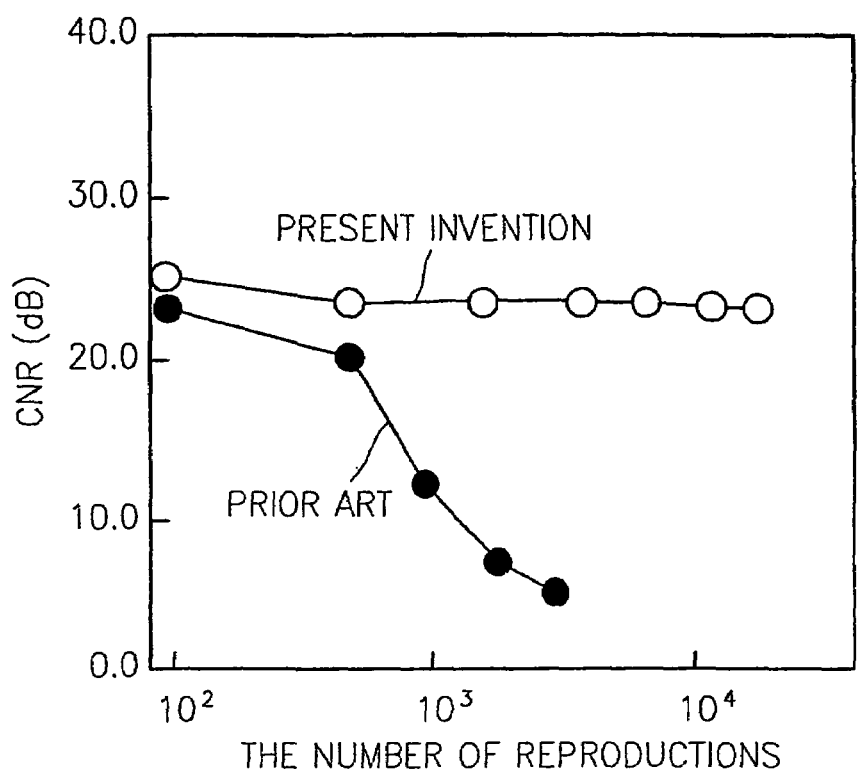
Figure 8C:
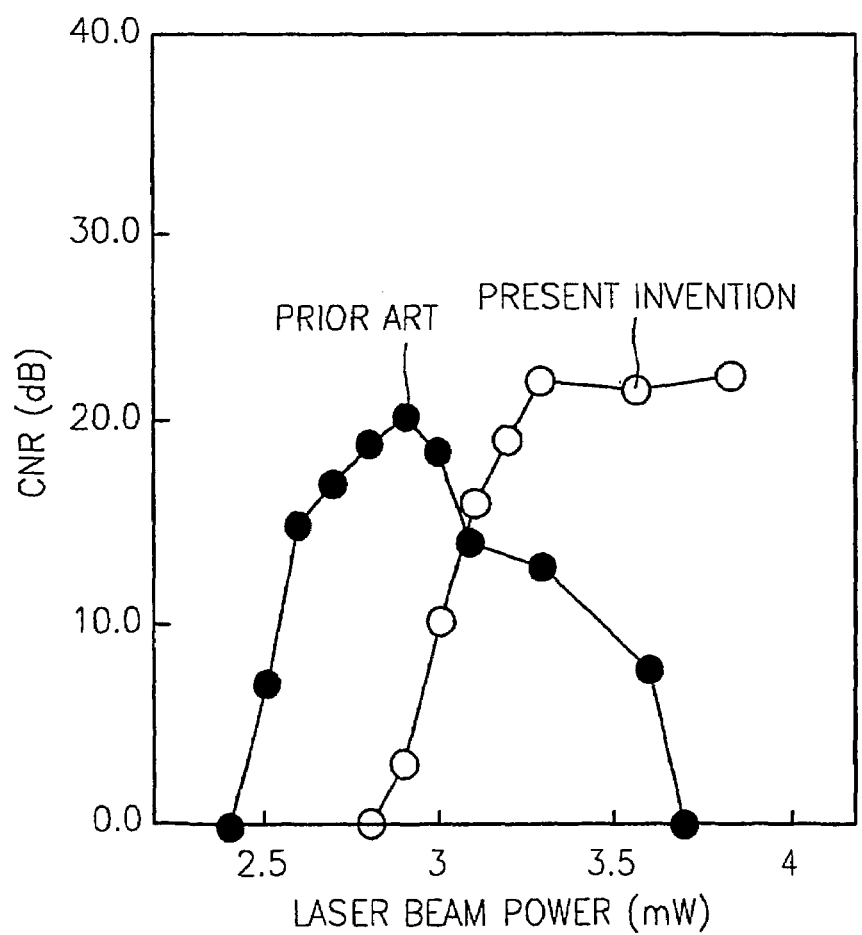
Figure 8D:
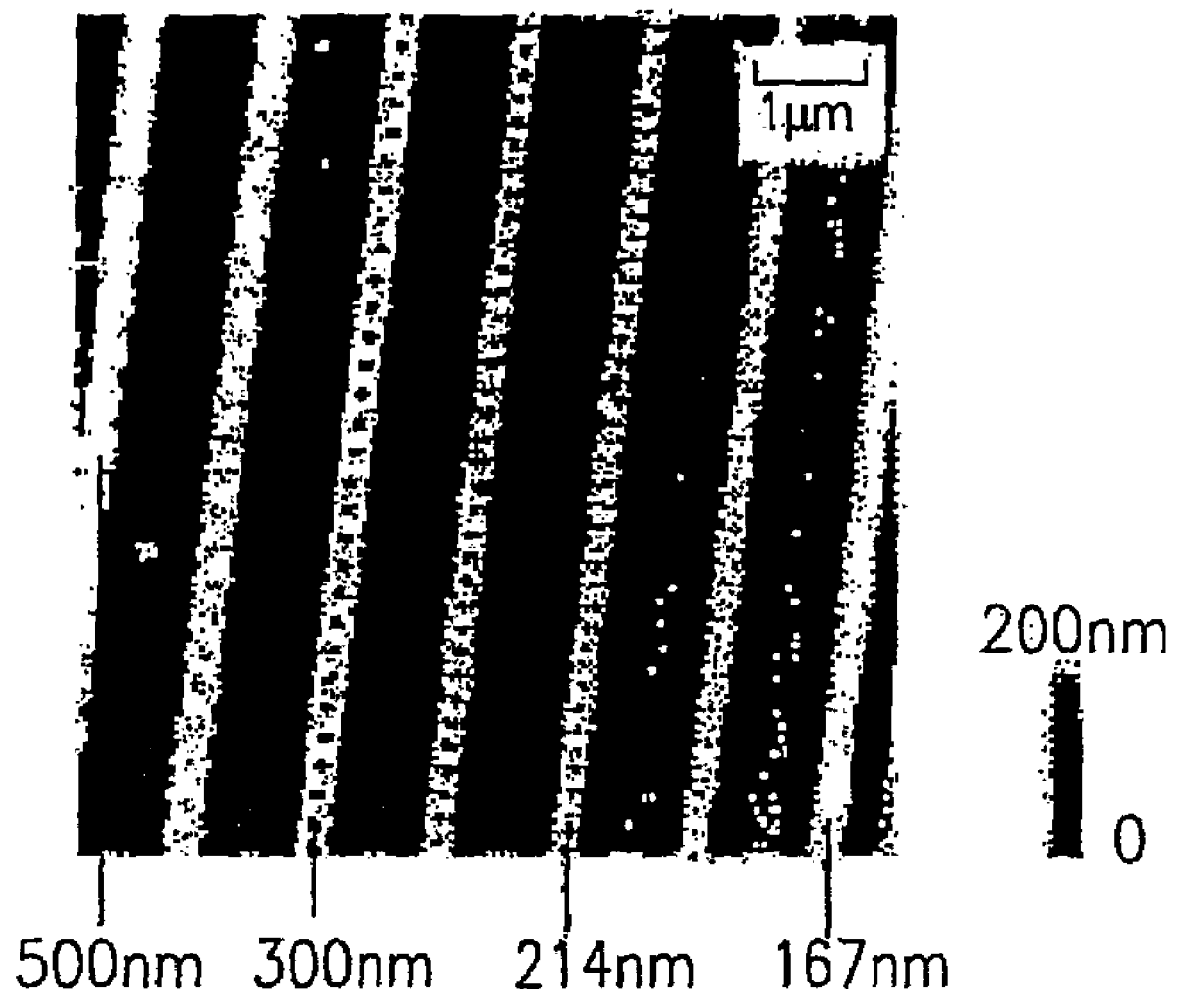
Figure 9A:
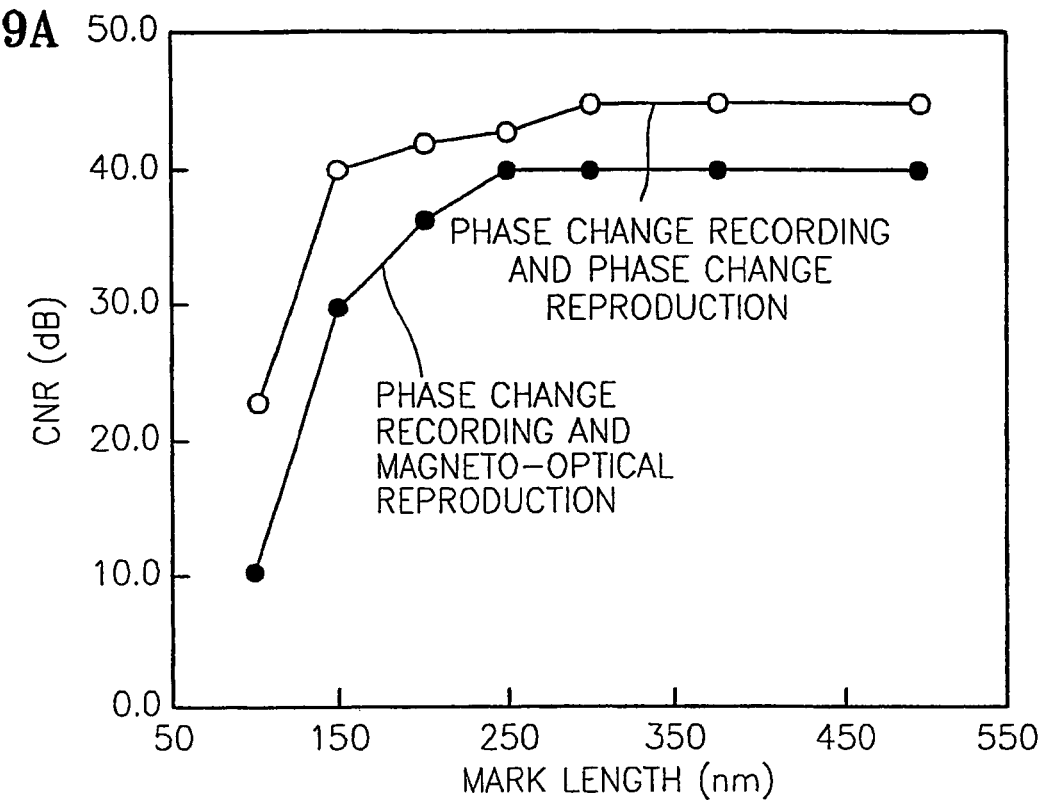
Figure 9B:
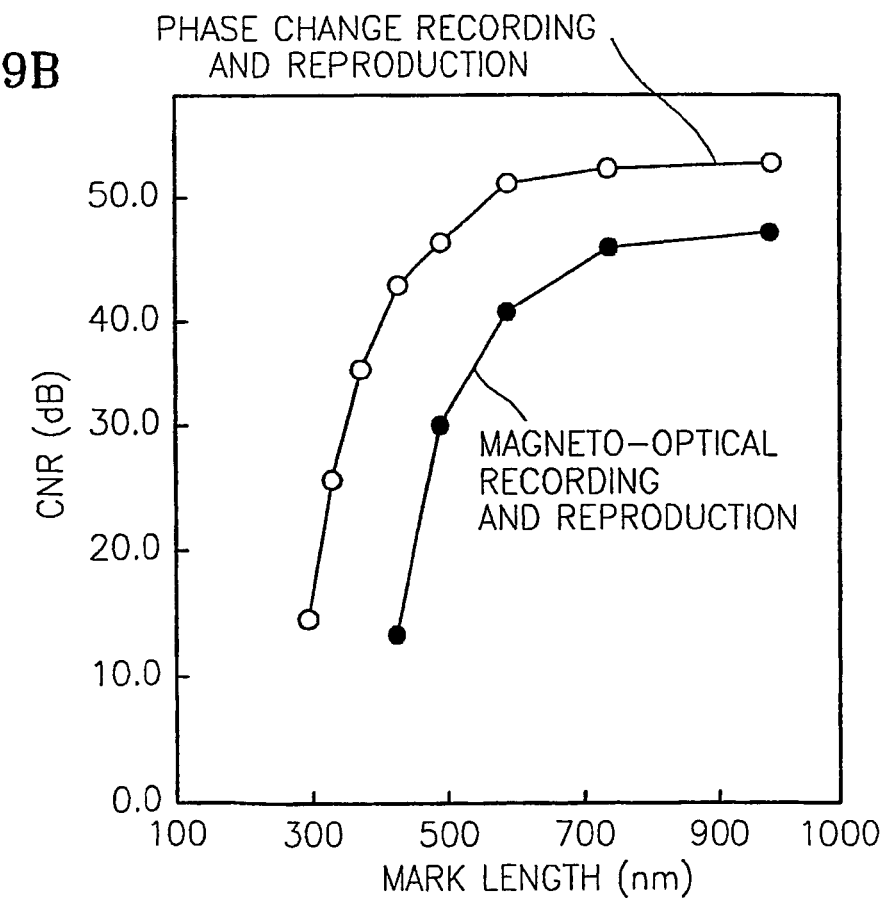

FIG. 5 is a comparative graph of a carrier to signal ratio (CNR) versus mark length for the recording media according to an embodiment of the present invention and conventional recording media. Recording was performed on the recording media according to an embodiment of the present invention by inducing reaction and diffusion in the recording layer made of tungsten by irradiating a 405-nm laser at a power of 11 mW, through a focusing lens having a numerical aperture of 0.65. Reproduction was performed using a 405-nm laser at a power of 4 mW and a focusing lens having a numerical aperture of 0.65. For the conventional super-resolution near-field recording media of FIGS. 1 and 2 and a general phase change-recording medium, recording and reproduction were performed using the same laser under the same conditions as for the recording media according to the embodiment of the present invention.

Figure 2:
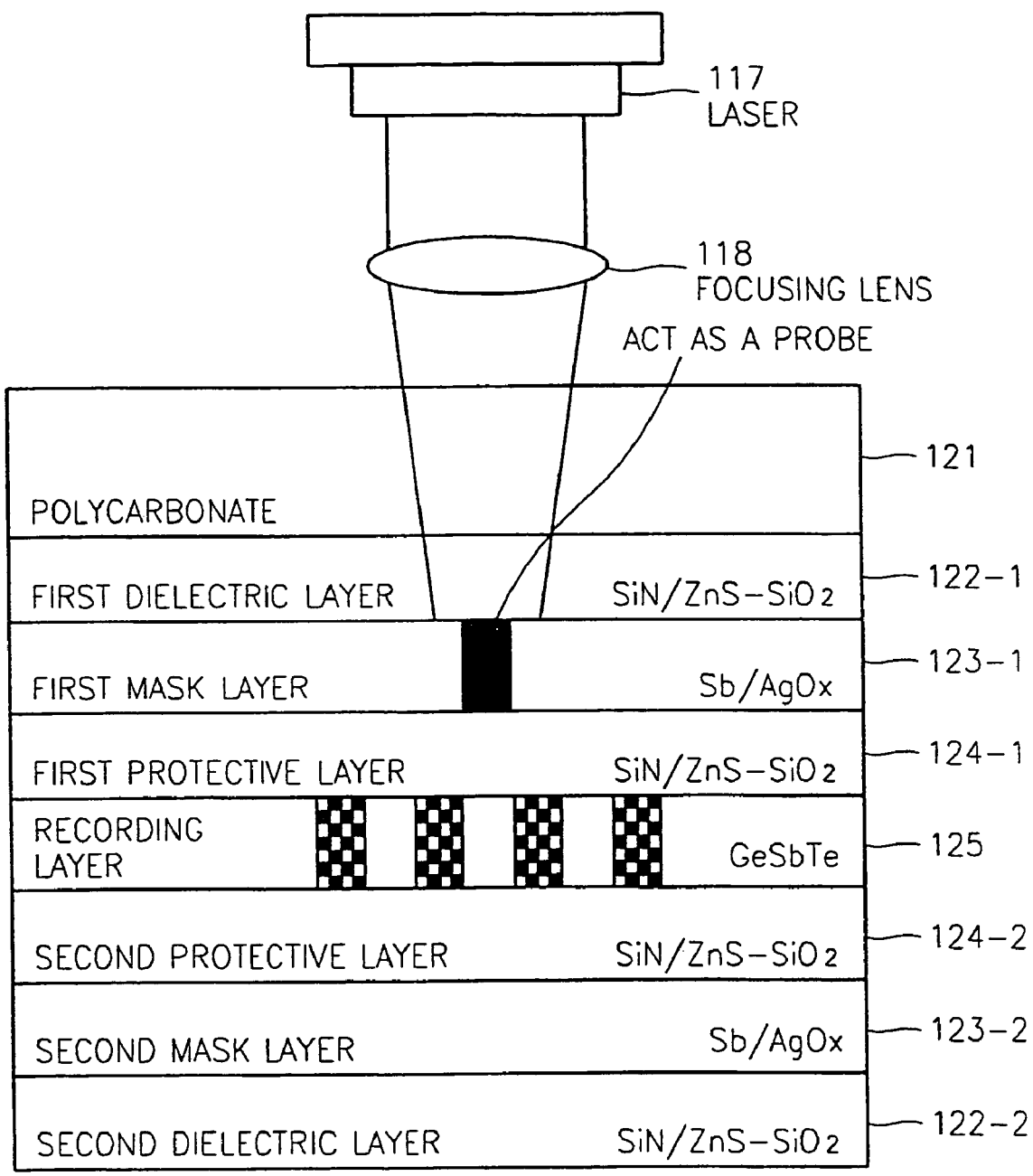
FIG. 2 illustrates the structure of another conventional recording medium using super-resolution near-field structure and the recording principle thereof.

As illustrated in FIG. 5, the CNR with respect to varying mark lengths is greatest for the super-resolution near-field recording medium of FIG. 4 and decreases in FIG. 3, the conventional super-resolution near-field recording medium of FIG. 2, the conventional super-resolution near-field recording medium of FIG. 1, and a general phase change recording medium. This indicates that high-density recording can be achieved with the super-resolution near-field structure of FIG. 4 according to the present invention, at a high CNR of about 45 dB for a mark length of 170 nm.

As described above, a recording medium with a high melting point recording layer and without a mask layer according to an aspect of the present invention is suitable for high-density recording and reproduction, using the recording and reproducing methods and apparatus according to the present invention, without causing the thermal stability related problems arising when reproducing information from conventional super-resolution near-field recording media. The recording medium according to an aspect of the present invention is low in cost due to its simple structure.

Although a few embodiments of the present invention have been shown and described, it would be appreciated by those skilled in the art that changes may be made in these embodiments without departing from the principles and spirit of the invention, the scope of which is defined in the claims and their equivalents.

The invention claimed is:

1. A recording medium comprising a high melting point recording layer between first and second dielectric layers, the high melting point recording layer consisting of at least one of tungsten, and tantalum, wherein, when recording an information, by laser irradiation from the direction of the first dielectric layer, the recording layer is swollen into the directions of the first and second dielectric layers at the laser-irradiated domain and crystalline particles of the recording layer and the first and the second dielectric layers are formed by the reaction and diffusion by the laser irradiation.

2. The recording medium of claim 1, further comprising a reflective layer on the second dielectric layer.

3. A method of recording information on a recording medium having a high melting point recording layer between first and second dielectric layers, the method comprising:
irradiating a laser beam onto the recording medium to induce reaction and diffusion in the high melting point recording layer and the first and second dielectric layers such that the recording layer is swollen into the directions of the first and second dielectric layers at the laser-irradiated domain and crystalline particles of the recording layer and the first and the second dielectric layers are formed by the reaction and diffusion by the laser irradiation, wherein the high melting point recording layer consists of at least one of tungsten, and tantalum.

4. The method of claim 3, wherein the recording medium further comprises a reflective layer on the second dielectric layer.

5. An apparatus for reproducing information from a recording medium having a high melting point recording layer between first and second dielectric layers, the apparatus generating plasmon using crystalline particles of the high melting point recording layer and the first and second dielectric layers as a scattering source to reproduce information recorded in the recording layer using a super-resolution near-field structure regardless of a diffraction limit of a laser, wherein the crystalline particles are swollen into the directions of the first and second dielectric layers, and wherein the high melting point recording layer consists of at least one of tungsten and tantalum.

6. The apparatus of claim 5, wherein the recording medium further comprises a reflective layer on the second dielectric layer.

7. A method of reproducing information from a recording medium having a high melting point recording layer between first and second dielectric layers, the method comprising generating plasmon using crystalline particles of the high melting point recording layer and the first and second dielectric layers as a scattering source to reproduce information recorded in the recording layer using a super-resolution near-field structure regardless of a diffraction limit of a laser, wherein the crystalline particles are swollen into the directions of the first and second dielectric layers, and wherein the high melting point recording layer consists of at least one of tungsten and tantalum.

8. The method of claim 7, wherein the recording medium further comprises a reflective layer on the second dielectric layer.

9. A high-density recording medium comprising:
a polycarbonate layer;
a first dielectric layer;
a high melting point recording layer, the high melting point recording layer consisting of at least one of tungsten and tantalum; and
a second dielectric layer, wherein crystalline particles of the recording layer and the first and second dielectric layers generate surface plasmon when reproducing information of the high-density recording medium,
wherein the crystalline particles are swollen into the directions of the first and second dielectric layers.

10. The high-density recording medium of claim 9, wherein, when recording an information, the recording medium is irradiated with a laser beam of approximately 11 mW and 405 nm wavelength, heating the recording layer equal to or above 600° C.

11. The high-density recording medium of claim 9, further comprising a reflective layer formed on the second dielectric layer.

12. The high-density recording medium of claim 11, wherein the reflective layer comprises aluminum and/or silver.

13. A method of recording and information on a recording medium having a high melting point recording layer, the high melting point recording layer consisting of at least one of tungsten and tantalum formed between first and second dielectric layers, the method comprising:
irradiating the recording medium with a laser beam;
heating the recording layer inducing a reaction and diffusion in a laser-irradiated domain;
forming crystalline particles in the recording layer and the first and second dielectric layers, the crystalline particles being swollen into the directions of the first and second dielectric layers; and
recording information on the recording layer in the form of marks smaller in size than a diffraction limit of the laser beam.

14. The method of claim 13, wherein the laser beam irradiating the recording medium is of approximately 11 mW and 405 nm wavelength.

15. The method of claim 14, wherein the recording layer is heated equal to or above 600° C.

16. The method of claim 7, wherein the reproducing of the information on the recording medium is achieved with a carrier to signal ratio (CNR) of approximately 45 dB for a mark length of 170 nm.

* * * * *

UNITED STATES PATENT AND TRADEMARK OFFICE
CERTIFICATE OF CORRECTION

| | | |
|---|---|---|
| PATENT NO. | : 7,572,496 B2 | Page 1 of 1 |
| APPLICATION NO. | : 10/514422 | |
| DATED | : August 11, 2009 | |
| INVENTOR(S) | : Kim et al. | |

It is certified that error appears in the above-identified patent and that said Letters Patent is hereby corrected as shown below:

Column 6, Line 50, change "tungsten," to --tungsten--.

Column 7, Line 5, change "tungsten," to --tungsten--.

Column 8, Line 18, change "and information" to --information--.

Signed and Sealed this

Seventeenth Day of November, 2009

David J. Kappos
*Director of the United States Patent and Trademark Office*